(12) United States Patent
Friesen et al.

(10) Patent No.: US 7,540,246 B2
(45) Date of Patent: Jun. 2, 2009

(54) FURROW OPENER

(76) Inventors: Dick Edward Friesen, Box 1940, Warman, SK (CA) S0K 4S0; Peter Hugh Barton, Box 100, Conquest, SK (CA) S0L 0L0

( * ) Notice: Subject to any disclaimer, the term of this patent is extended or adjusted under 35 U.S.C. 154(b) by 0 days.

(21) Appl. No.: 12/104,634

(22) Filed: Apr. 17, 2008

(65) Prior Publication Data

US 2008/0257237 A1    Oct. 23, 2008

(30) Foreign Application Priority Data

Apr. 17, 2007  (CA) .................................. 2587130

(51) Int. Cl.
*A01C 5/00*  (2006.01)
*A01C 7/00*  (2006.01)
*A01C 9/00*  (2006.01)
*A01C 13/00* (2006.01)

(52) U.S. Cl. .................... 111/167; 111/187; 111/194

(58) Field of Classification Search ............. 111/118, 111/119, 121, 123–126, 129, 186–188, 150, 111/157, 163, 167, 194
See application file for complete search history.

(56) References Cited

U.S. PATENT DOCUMENTS

| 6,032,593 | A  | 3/2000  | Wendling et al. |
| 7,004,090 | B2 | 2/2006  | Swanson |
| 7,152,539 | B2 | 12/2006 | Swanson |

OTHER PUBLICATIONS

Web-site page from Atom Jet Industries showing SDX system http://www.atomjet.com/page.aspx?page_id=108.

*Primary Examiner*—Christopher J. Novosad
(74) *Attorney, Agent, or Firm*—Frost Brown Todd LLC

(57) ABSTRACT

A furrow opener device includes a disc arranged to open a primary furrow in the ground. A scraper body has a leading scraper edge supported alongside the disc to scrape the disc. A wing member is supported on a bottom portion of the scraper body in proximity to a bottom end of the disc and extends laterally outwardly away from the disc so as to be arranged to open a groove in the primary furrow projecting laterally to one side of the primary furrow, and a tube extends generally downward to an output opening located adjacent the wing member and is arranged for depositing product into the groove.

17 Claims, 10 Drawing Sheets

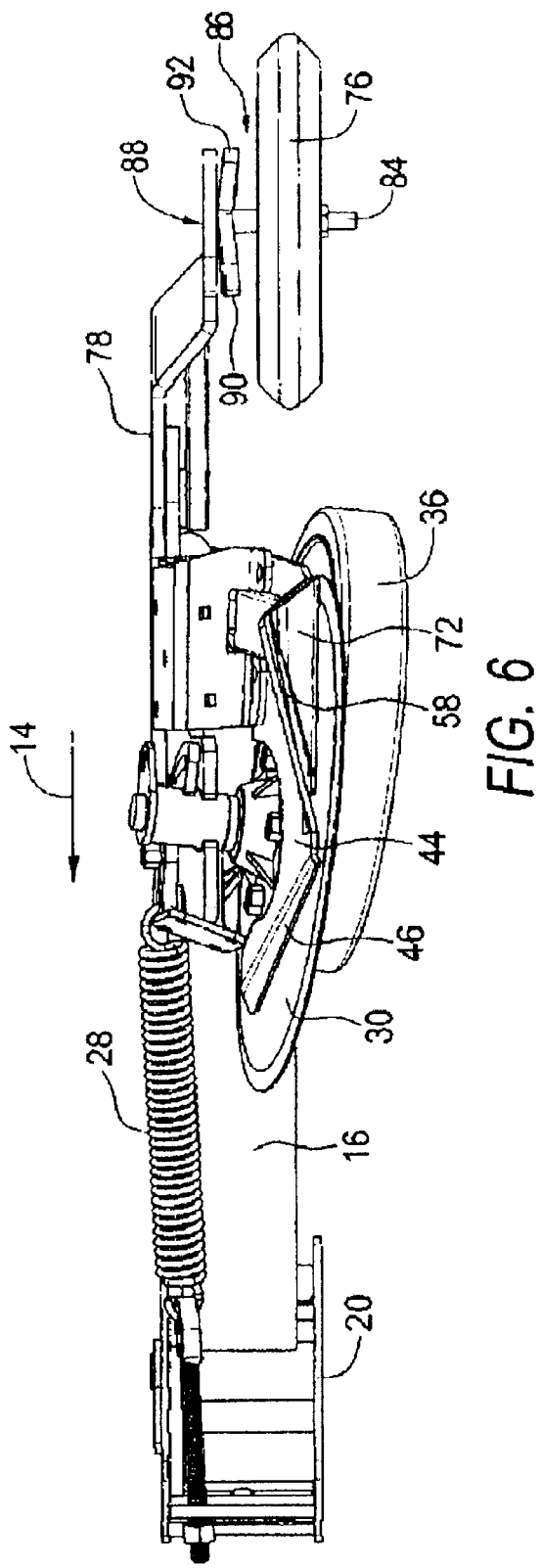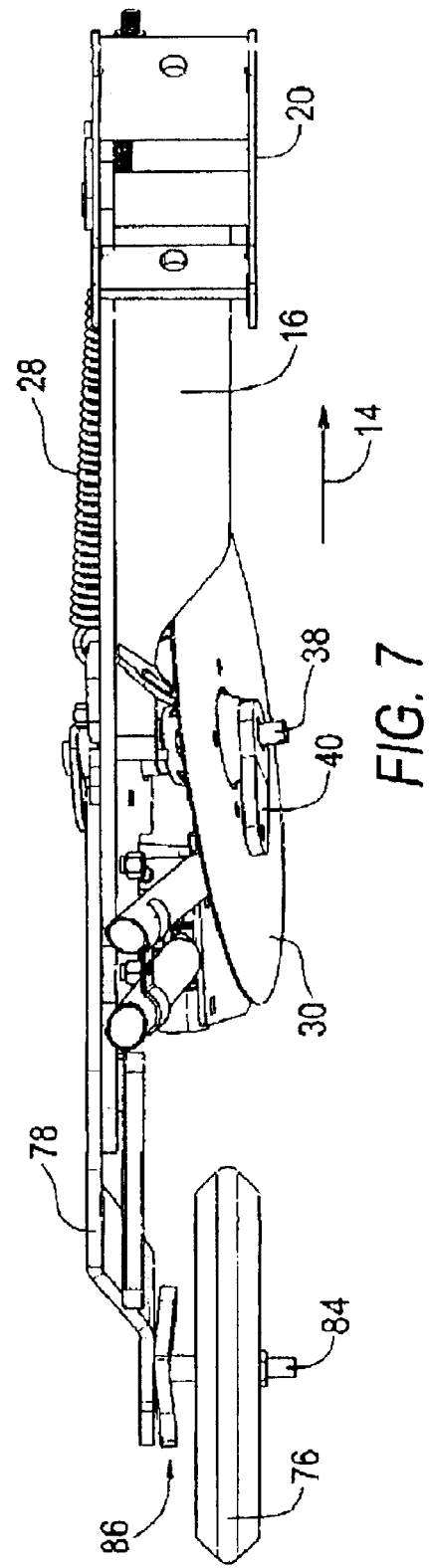

FURROW OPENER

The present invention relates to a furrow opener, and more particularly relates to a furrow opener comprising a disc for forming a primary furrow to deposit fertilizer therein and a scraper operable in cooperation with the disc having a wing member for forming a groove in the primary furrow to deposit seed therein.

BACKGROUND

No-tillage planting is an increasingly utilized planting technique in agriculture in which a furrow opener is typically provided in the form of a rotatable disc opener that fractures the soil into a furrow of disturbed soil. A seed boot is typically located to one side of the disc for placing seed into the furrow before closing the furrow. In planting the seed it is further desirable to deposit fertilizer in proximity to the seed in which a seed row is positioned upwardly and to one side of a fertilizer row in a single pass. U.S. Pat. Nos. 7,004,090 and 7,152,539 both belonging to Swanson disclose examples of disc openers in which a wing is supported on the seed boot to support liquid fertilizer injection nozzles arranged to dispense liquid fertilizer in proximity to the seed row. The configuration of the injectors however causes the injectors to be readily subject to plugging which prevents effective fertilizer placement. Furthermore the location of the wing with the fertilizer nozzles thereon is supported on the seed boot so that the openers are unable to adequately place a seed row in a desired upward and laterally offset placement relative to a fertilizer row.

U.S. Pat. No. 6,032,593 belonging to Wendling et al. discloses a further example of a drill opener for positioning seed and fertilizer rows in a single pass, however, in order to do so a complex mechanism involving two discs for forming separate furrows is taught to be required. The resulting configuration is accordingly costly to manufacture and requires more maintenance than a single disc opener.

Another example of a disc opener which attempts to place a seed row spaced from a fertilizer row in a single pass is available by Atom-Jet Industries of Brandon, Canada. A scraper is taught for attachment to a Case IH SDX disc opener in which a horizontal plate is supported integrally with the scraper to widen the furrow formed by the disc and form a shelf in the furrow while doing so. A deflector plate is provided in an upright orientation between a seed tube and a fertilizer tube between the scraper and the disc with the intention of depositing fertilizer at the bottom of the disc furrow while seed is intended to be deposited on the shelf formed by the horizontal plate. As the shelf is open to the deeper part of the furrow and the configuration of the seed boot is arranged to drop seed from above onto the seed shelf, it is possible that seed can readily bounce off of the seed shelf and into the deeper portion of the furrow adjacent the fertilizer where it is subject to damage from high concentrations of fertilizer.

SUMMARY OF THE INVENTION

It is an object of the present invention to provide a furrow opener apparatus that overcomes problems in the prior art.

In a first embodiment the present invention provides furrow opener device comprising a disc arranged to be displaced across the ground in a forward working direction to open a primary furrow in the ground, and a primary product delivery tube is arranged to deposit a first product into the primary furrow. A scraper body extends generally rearward from a leading scraper edge of the scraper body to a rear trailing edge of the scraper body, the leading scraper edge of the scraper body being supported alongside the disc ahead of the primary product delivery tube so as to be arranged to scrape the disc. A wing member is supported on a bottom portion of the scraper body in proximity to a bottom end of the disc and extending laterally outwardly away from the disc so as to be arranged to open a groove in the primary furrow projecting laterally to one side of the primary furrow, and a secondary product delivery tube extends generally downward from an input opening at a top end of the secondary product delivery tube to an output opening at a bottom end of the secondary product delivery tube located adjacent the wing member and is arranged for depositing the product through the secondary product delivery tube into the groove in the primary furrow opened by the wing member.

In a second embodiment the present invention provides a furrow opener device arranged to be supported on an implement frame for being displaced across the ground in a forward working direction. The furrow opener device comprises an opener arm arranged to be supported on the implement frame and a furrow opener supported on the opener arm to open a furrow in the ground when displaced in the forward working direction. A product delivery tube is configured to deposit product into the furrow. A gauge wheel is supported adjacent the furrow opener, the gauge wheel having a bottom edge supported spaced above a bottom end of the furrow opener. A packer arm is supported on the opener arm to extend rearwardly in relation to the furrow opener, and a packer wheel is rotatably supported on the packer arm rearwardly of the furrow opener. A packer mechanism is operative to pivotally support the packer arm on the opener arm in a first configuration wherein the packer wheel is biased downwardly in relation to the opener arm and can move up and down with respect to the opener arm such that the depth of penetration of the furrow opener is gauged by the gauge wheel, and in a second configuration wherein the packer arm is fixed relative to the opener arm such that the depth of penetration of the furrow opener is gauged by the packer wheel.

In a third embodiment the present invention provides a furrow opener device arranged to be supported on an implement frame for being displaced across the ground in a forward working direction. The furrow opener device comprises an opener arm arranged to be supported on the implement frame, and a furrow opener supported on the opener arm to open a furrow in the ground when displaced in the forward working direction. A product delivery tube is configured to deposit product into the furrow. A packer arm is pivotally attached to the opener arm by a packer pin extending through corresponding holes in a front end of the packer arm and a rear end of the opener arm, the packer arm extending rearwardly in relation to the furrow opener. A packer wheel is supported on the packer arm rearwardly of the furrow opener. The packer pin comprises a head at a head end thereof bearing against a first surface of one of the packer arm and the opener arm, and a lever arm fixed to an opposite lever end of the packer pin. The front end of the packer arm includes a forwardly projecting lug at a pointed tip thereof which engages with a selected one of a plurality of mating sockets positioned on the opener arm and fixed along an arc like path at a location spaced ahead of packer pin, the arc having a center at the packer pin. A cam member is positioned on the lever end of the packer pin between the lever arm and a second surface of the other one of the packer arm and the opener arm. The cam member is configured such that moving the lever arm to an unlatched position allows the head of the packer pin to move away from the first surface thereby allowing the packer arm to be separated sufficiently from the opener arm in an axial direction of the packer pin such that the lug may be released from engagement with the selected socket to permit angular adjustment of the packer arm relative to the opener arm so that the lug can be aligned with a different one of the sockets; and such that moving the lever arm to a latched position clamps the packer arm and opener arm together and causes the lug to engage in a next desired mating socket.

By providing a wing which extends outward from the bottom end of the scraper a groove can be formed in a side of the disc furrow which projects laterally outward therefrom with a layer of dirt being maintained above the wing to trap seed in the groove fanned and prevent seed bounce into the deeper part of the disc furrow. Further arranging the wing to slope downwardly and outwardly ensures that the seed is delivered to the most outward portion of the wing, farthest from the disc and farthest from the deeper part of the furrow where fertilizer is placed.

It is contemplated that the primary product delivery tube will typically be arranged to deposit fertilizer into the primary furrow and the secondary product delivery tube arranged to deliver seed to the groove in the furrow spaced upwardly and to one side relative to the fertilizer.

A top side of the wing member preferably spans at a slight upward incline from a front end to a back end of the wing member so that the wing draws itself downward when engaged in the ground.

The packer mechanism may be arranged to pivotally support the packer arm on the disc arm such that the packer wheel is biased downwardly in relation to the disc arm in the first configuration such that the depth of the furrow is gauged by the gauge wheel, while also being arranged to fix the packer arm relative to the disc arm in the second configuration such that the depth of the furrow is gauged by the packer wheel.

The location of the wing to be effectively pulled through the ground below the surface of the ground has the advantage of avoiding straw being drawn into the furrow as the soil is disturbed below the surface rather than pulling material from the surface down into the ground.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 6 is a bottom plan view of the opener.

FIG. 7 is a top plan view of the opener with the gauge wheel shown removed.

DETAILED DESCRIPTION

Figure 1:
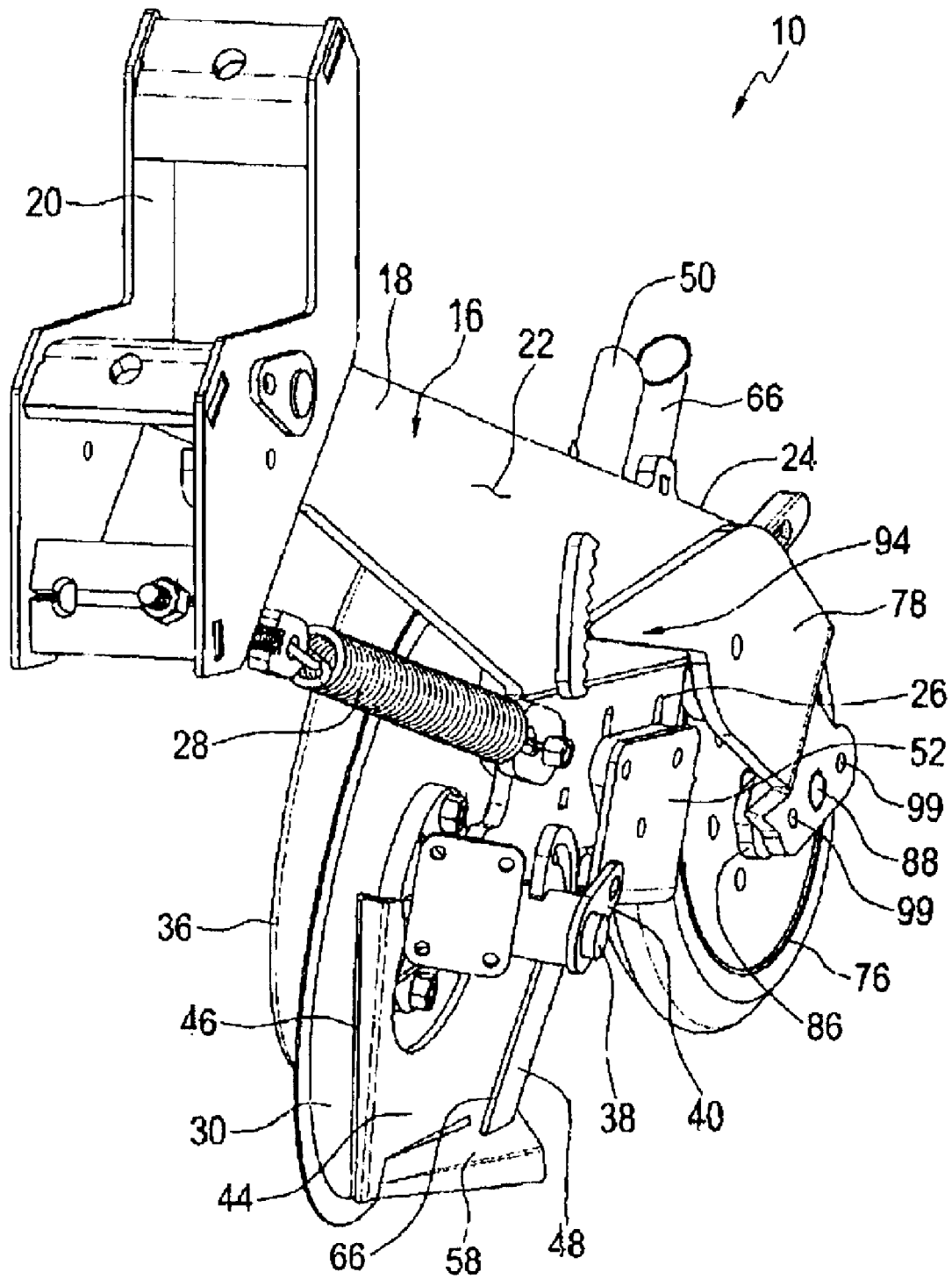
FIG. 1 is a perspective view of the furrow opener according to the present invention.
Figure 2:
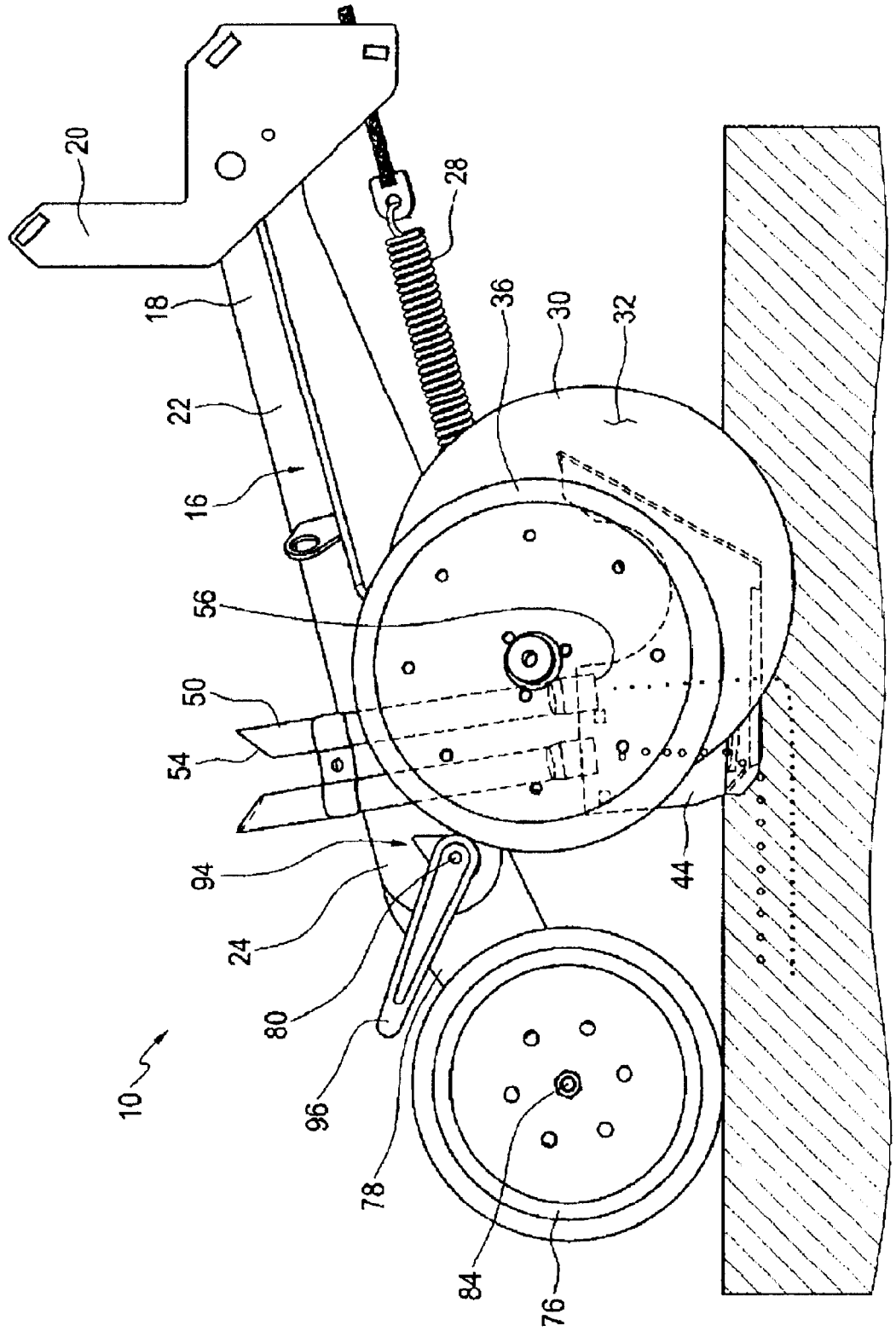
FIG. 2 is a side elevational view of the first side of the furrow illustrating placement of a seed row and fertilizer row in the ground.
Figure 3:
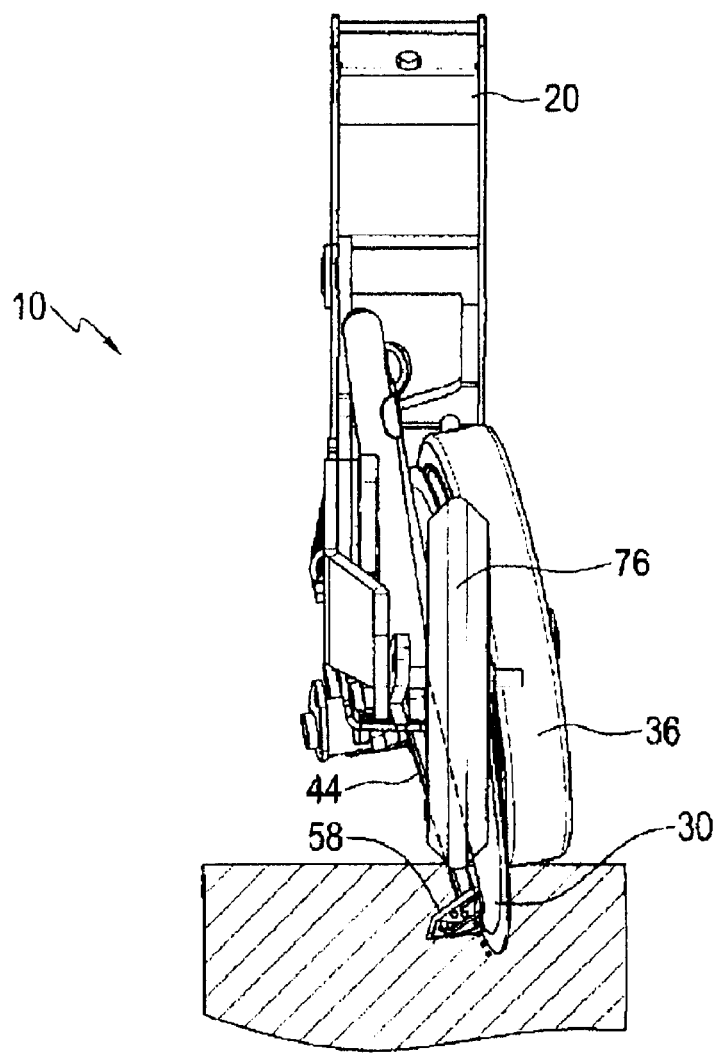
FIG. 3 is a rear elevational view of the opener in use in accordance with FIG. 2.
Figure 4:
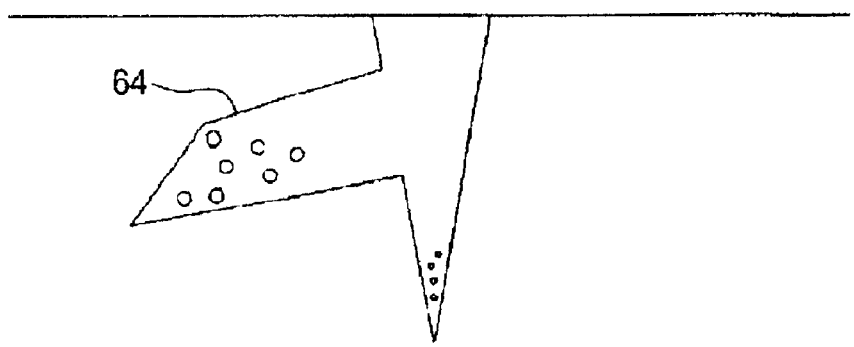
FIG. 4 is a schematic illustration of the furrow formed by the disc and the groove formed in the furrow by the wing member.
Figure 5:
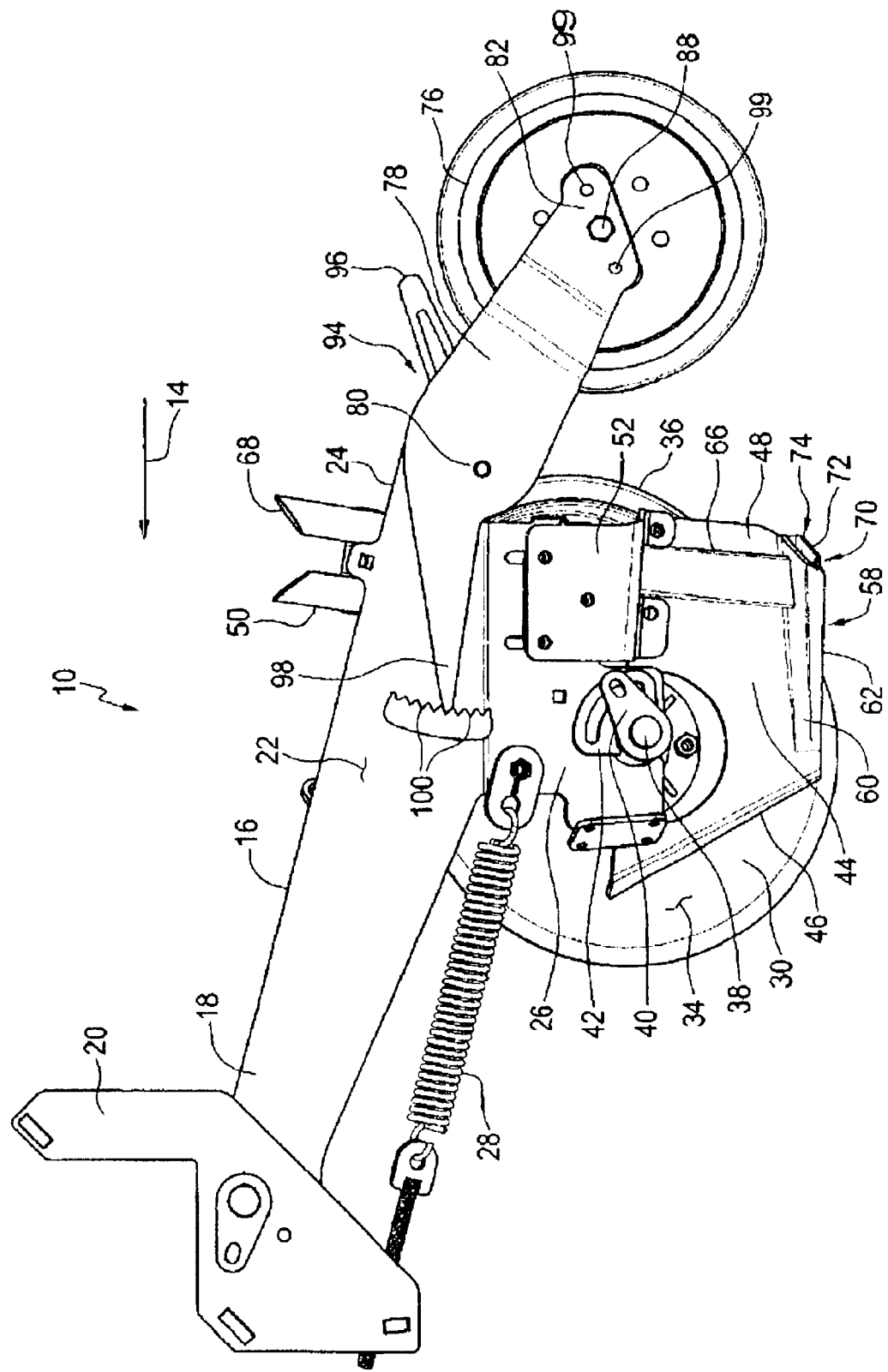
FIG. 5 is a side elevational view of a second side of the opener.
Figure 9:
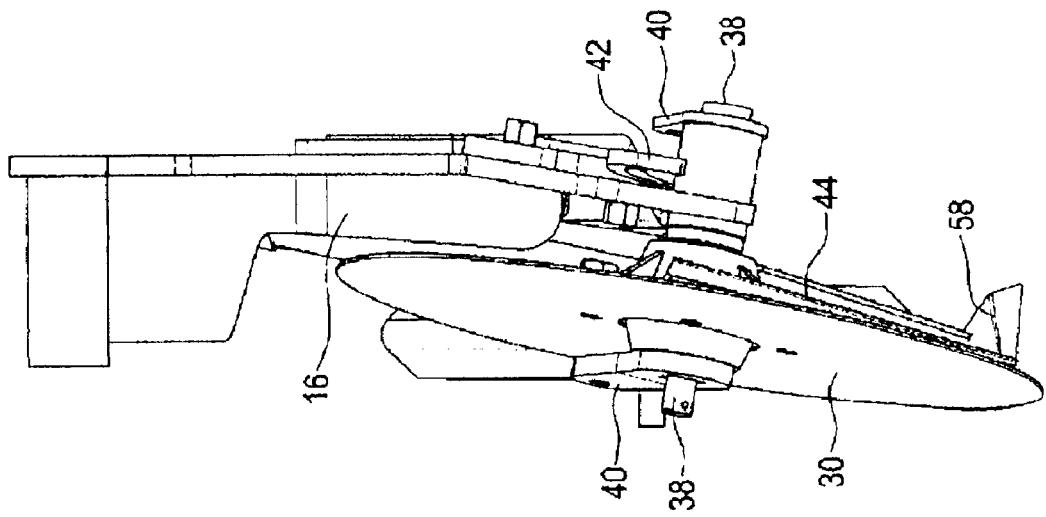
FIG. 9 is a front elevational view of the opener with the gauge wheel shown removed.
Figure 8:
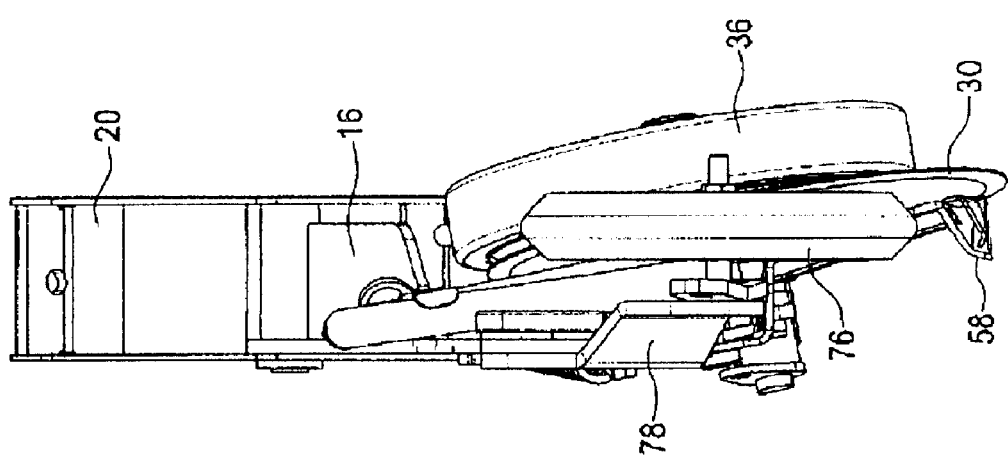
FIG. 8 is a rear elevational view of the opener.
Figure 10:
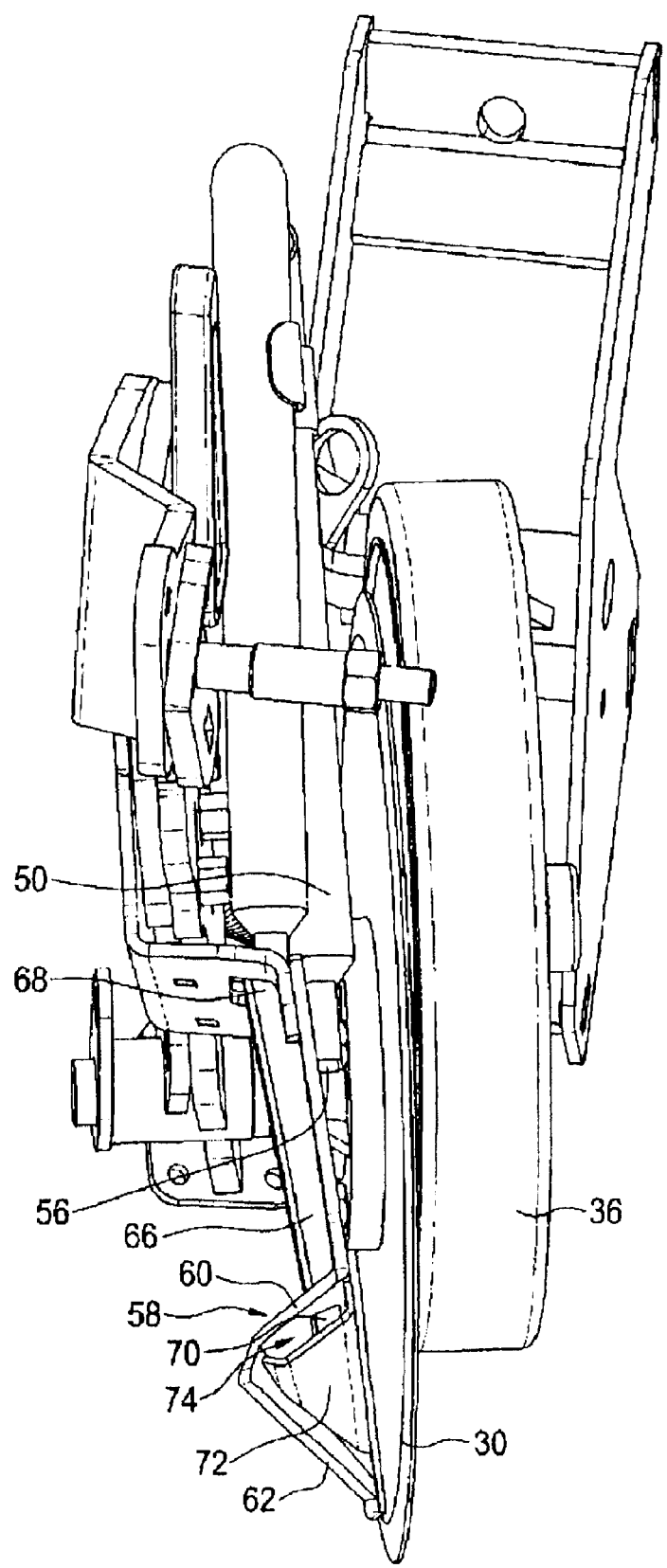
FIG. 10 is a perspective view of a bottom and rear of the opener with the packer wheels shown removed to illustrate an outlet of the fertilizer tube and the seed tube.

FIGS. 1-10 illustrate a double shoot disc furrow opener generally indicated by reference numeral 10. A plurality of the openers 10 are arranged to be supported on a common implement frame for being towed across the ground in a forward working direction 14 for planting seed rows and fertilizer rows in the ground.

The opener generally comprises a disc arm pivotally supported at a front end 18 on a suitable frame mount 20. The disc arm 16 includes a longitudinally extending portion 22 extending generally in the forward working direction 14 from the front end to a rear end 24 of the disc arm. The disc arm also includes a depending portion 26 extending downward from the longitudinally extending portion 22 adjacent the rear end 24 thereof. A spring 28 is provided coupled adjustably between the frame mount 20 spaced below pivotal connection of the disc arm thereon and the depending portion 26 of the disc arm such that the spring is held under tension during normal operation to bias the disc arm downwardly into engagement with the ground. As is known in the art, a hydraulic cylinder could also be used to provide the required downward bias force.

A disc 30 is rotatably supported on a respective pivot shaft supported on the depending portion 26 of the disc arm, closer to the rear end than the front end thereof. The disc 30 is supported at a generally upright orientation inclined only slightly with respect to the forward working direction 14 while also being inclined slightly from a vertical plane. The inclination of the disc relative to the forward working direction defines an outer leading side 32 of the disc which faces partially forward and laterally outwardly, and an inner trailing side 34 which faces laterally outwardly in the opposing direction and partly faces rearwardly.

A gauge wheel 36 is rotatably supported adjacent the disc 30 on the disc arm, so as to be located adjacent the leading side 32. The gauge wheel is supported on the disc arm about a respective axis which is spaced generally upwardly and rearwardly in relation to the axis of the disc 30 with the gauge wheel also being smaller in diameter than the disc so that the bottom of the gauge wheel is spaced upwardly from a bottom end of the disc to control depth of penetration of the disc into the ground when the gauge wheel 36 rides along the surface of the ground. Position of the gauge wheel is adjustable relative to the disc for adjusting the depth of penetration of the disc. The gauge wheel 36 also functions to clean the outer side of the disc due to the dose proximity thereof.

The gauge wheel is adjustably supported on the disc arm by a shaft 38 which extends concentrically through a pivot shaft supporting the disc 30 and which mounts levers 40 on the inner and outer ends thereof. The gauge wheel 36 is rotatably supported on the free end of the lever 40 at the outer side of the disc so as to be radially offset from the shaft 38. Accordingly rotation of the shaft causes the lever 40 at the outer end to be rotated therewith for positioning the axis of the gauge wheel at the free end thereof upwardly and downwardly when the lever is arranged to extend generally rearwardly in normal operation.

An anchor plate 42 is provided at the inner side of the disc in fixed relation to the disc arm for cooperation with the lever 40 at the inner end of the shaft 38. An arcuate shaped slot is provided in the anchor plate which extends partway about a circumference of the shaft 38 for alignment with a fastener aperture at a free end of the lever 40 on the inner end of the shaft. A suitable fastener can be provided in cooperation between the fastener aperture and the lever and the arcuate slot for selectively fixing the lever 40 at various angular positions about an axis of the shaft.

As both levers are rotatable with the shaft fixing the position of the inner end of the lever 40 with a fastener suitably fixes position of the lever at the outer end to fix position of the gauge wheel thereon.

A scraper body 44 is mounted on the inner side of the disc arm 16 to be positioned alongside the inner side of the disc. The scraper body extends generally rearwardly alongside the disc from a leading edge 46 ahead of the disc axis to a trailing edge 48 which is spaced rearwardly from the disc axis. The leading edge 46 is arranged to be generally upright alongside the disc to extend at a generally rearward incline from a top end in substantially horizontal alignment with the disc axis to a bottom end near a bottom end of the disc directly below the axis of the disc. The leading edge 46 is positioned directly against the inner side of the disc so as to be arranged to scrape the disc as the disc is rotated as it is displaced through the ground.

The scraper body 44 spans rearwardly at an outward incline to be spaced laterally from the disc towards the trailing edge 48. The trailing edge 48 is positioned near a rear of the disc in the longitudinal direction spaced laterally outward therefrom sufficiently to receive a primary product delivery tube 50 extending downwardly from the disc arm therebetween.

The scraper body includes a bracket portion 52 extending upwardly near the trailing edge 48 thereof for connection to the disc arm to support the scraper body fixed on the disc arm. Vertical slots are provided on the depending portion of the disc arm for cooperation with fasteners received through cooperating apertures on the bracket portion of the scraper body so that the scraper body can be fastened La the disc arm at various positions along the slots corresponding to various heights of the scraper body relative to the disc.

The first product delivery tube 50 includes an input 54 adjacent the top end thereof which is arranged for connection to a product delivery tube on the implement frame which delivers fertilizer in particulate form in a preferred embodiment, or any other desired agricultural product such as seed, herbicides, pesticides, and the like. The product is then received through the product tube 50 to be dispensed from an output 56 at a bottom end of the tube which is positioned just slightly rearwardly of the disc axis between the disc and the scraper body to deposit the first product through the primary product delivery tube 50 into the deepest portion of the furrow formed by the disc between the bottom end of the scraper body and the bottom end of the disc.

A wing member 58 is supported on the bottom end of the scraper body to extend generally laterally outwardly therefrom. The wing member 58 can he formed integrally with the scraper body and extends near horizontally in a longitudinal direction in line with the forward working direction from a front end near the bottom of the leading edge 46 of the scraper body to a rear end spaced laterally outwardly in relation to the disc. The wing member 58 has an increasing lateral cross section from the front end to the rear end thereof so as to define a generally wedge shape when viewed from above.

The wing member 58 includes a top plate 60 which spans a full length of the wing member from the front end to the rear end thereof and a full width from the scraper body to extend laterally outwardly at a downward and outward incline towards the outer side edge 62 of the wing member 58. The top plate 60 extends rearwardly from the front end to the rear end near horizontal but at a slight upward incline. An inner edge of the wing member opposite the outer edge 62 is formed integrally with the scraper body so that the wing member is adjacent to the disc at the front end but is spaced outwardly from the disc adjacent the rear end thereof.

The increased lateral dimension of the wing 58 at the rear end causes the outer edge to extend laterally outwardly from a position adjacent the disc at the front end to a position spaced laterally outwardly from the disc sufficiently that the wing member forms a groove in a side of the furrow formed by the disc in which the groove extends laterally outwardly in relation to the furrow into the surrounding ground below a surface of the ground where seed can be deposited at the free end of the groove 64 farthest from the furrow receiving the fertilizer therein. The groove 64 is arranged to be formed below the surface of the ground due to the location of the wing member 58 arranged to be supported below ground in operation due to the top plate being spaced below the bottom end of the gauge wheel so as to be spaced below a gauge height of the disc opener which gauges depth of penetration of the disc to form the disc furrow, Since the top plate 60 extends at a slight upward incline, the wing member is drawn downward into the ground when engaged in the soil in the wall of the furrow.

A secondary product delivery tube 66 is provided for delivering seed therethrough for being deposited in the groove 64 formed in the side of the disc furrow by the wing member 58. The secondary product delivery tube 66 comprises a passage extending through the scraper body so as to be fully enclosed from an input 68 at a top end of the scraper body arranged for connection to a seed delivery tube of a seeding implement for receiving seed, to an output 70 at a bottom end of the scraper body to deposit seed from the wing member 58 at the outermost point of the groove 64 relative to the primary furrow formed by the disc. The output 70 is arranged to be near the bottom of the disc wherein a plane of the opening is generally horizontal and open through the bottom side of the top plate 60 forming the wing member 58. The outer edge 62 of the wing member extends downwardly from the top plate along the length of the wing member to define a height of the groove 64 formed in the earth as the wing member passes through the ground. The output 70 is located adjacent the rear of the scraper body so as to be spaced laterally outwardly in relation to the disc.

A shield member 72 is supported generally parallel and spaced below the top plate 60 of the wing member so as to extend generally horizontally in the longitudinal direction a length of the wing member and the width thereof spanning generally between the scraper body and the outer edge 62. Accordingly an outlet chamber 74 is defined within the space between the shield member and the top plate of the wing members spaced thereabove with the two being joined together at the front end and along both sides thereof so that the outlet chamber 74 is only open to a rear and to a bottom of the wing member. The close proximity of the shield member 72 to the outlet opening or output 70 of the second product delivery tube 66 prevents dirt and debris from entering the output and thereby prevents plugging. The shield member 72 extends rearwardly past the output 70. The shield member is sloped generally downwardly and outwardly from the scraper body to the outer edge of the top plate 60 so that seed deposited thereon by the secondary product delivery tube 66 is encouraged to be displaced towards the outer free end spaced farthest from the disc in operation.

A packer wheel 76 is provided spaced rearwardly from the disc by a packer arm 78.

The packer arm 78 is pivotally connected at a front end thereof to a rear end of the disc arm at a packer arm pin 80 providing a pivot axis spaced upwardly and rearwardly from the disc. Pivoting the packer arm 78, which extends generally rearwardly from the disc arm and which mounts the packer wheel 76 rotatably on the rear end 82 thereof, effectively causes the height of the packer wheel 76 relative to the disc support on the disc arm to be adjusted and thereby adjust the depth of the furrow. The packer wheel 76 is arranged to be rotatable about a respective axis extending near horizontally and near perpendicular to the forward working direction of the opener. The packer wheel is arranged to track the disc for packing the disturbed soil in the furrow as the opener passes over the ground.

The packer wheel 76 is rotatably supported on a respective post 84 defining the axis of rotation of the wheel. The post 84 is fixed on a rocker plate 86 which is in turn supported in the packer arm 78 at the rear end thereof. A center of the rocker plate 86 is secured to the rocker plate 86 by a central pivot bolt 88 at the axis of rotation of the post 84. Front and rear flanges 90 and 92 extend forwardly and rearwardly respectively from the post 84 to define the rocker plate 86. The front and rear flanges are oriented so as to have an interior angle therebetween which is less than 180 degrees on the interior side supporting the post and wheel thereon.

The opposing side of the rocker plate can be secured against a flat portion of the packer arm 78 by flange fasteners 99 with the center pivot bolt 88 being at a center between the front and rear flanges. Each of the front and rear flanges locates one of the flange fasteners 99 adjacent the free end thereof so as to be arranged to fix the spacing of the free end of the respective flange relative to the disc arm. By alternately positioning the front flange adjacent the disc arm with the rear flange spaced therefrom and the rear flange adjacent the disc arm with the front flange spaced therefrom, the rocker plate 86 is arranged to be pivoted within a range of several degrees from the illustrated middle position about a generally vertical axis so that the post 84 and packer wheel supported thereon are effectively also rotated about the vertical axis for adjusting an inclination of the packer wheel 76 relative to a vertical plane in the forward working direction as desired to accommodate different packing configurations.

In the preferred embodiment pivotal positioning of the packer arm 78 relative to the disc arm 16 about the respective pivotal connection therebetween is arranged to be fixed in place at one of various positions by a suitable latch 94.

Figure 13:
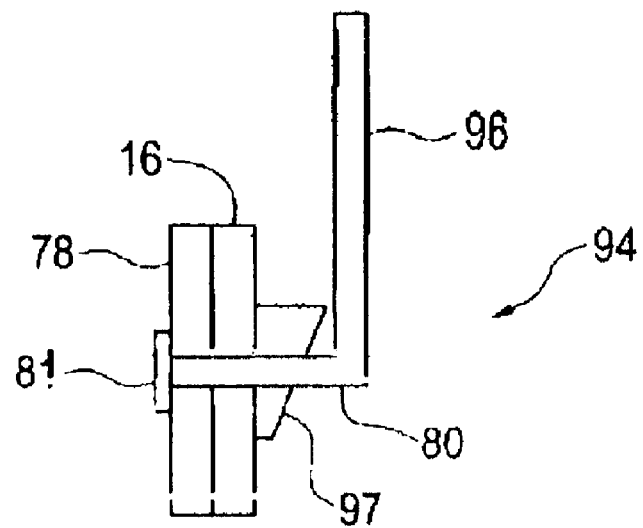
FIG. 13 is a schematic rear elevational view of the earn mechanism for locking packer arm to the disc arm, with the lever arm in the latched position.
Figure 14:
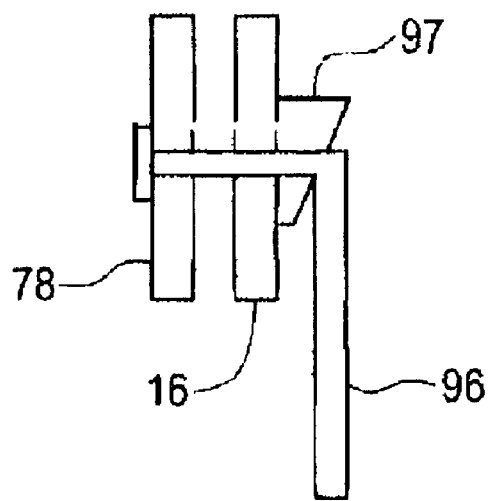
FIG. 14 is a schematic rear elevational view of the earn mechanism of FIG. 13 with the lever arm in the unlatched position.

As also illustrated in more detail in FIGS. 13 and 14, the packer pin 80 comprises a head 81 at a head end thereof bearing against the surface of the packer arm 78. A lever arm 96 is fixed to an opposite lever end of the packer pin 80. The front end of the packer arm includes a forwardly projecting lug 98 at a pointed tip thereof which engages with a selected one of a plurality of mating sockets 100 positioned on the disc arm 16 and fixed along an arc like path at a location spaced ahead of packer pin 80, the arc having a center at the packer pin.

A cam member 97 is positioned on the lever end of the packer pin 80 between the lever arm 96 and the surface of the disc arm 16. The cam member 97 is configured such that moving the lever arm 96 to an unlatched position, shown in FIG. 14, allows the head of the packer pin to move away from the surface of the packer arm thereby allowing the packer arm to be separated sufficiently from the disc arm in an axial direction of the pivot pin 80 such that the lug 98 may be released from engagement with the selected socket to permit angular adjustment of the packer arm 78 relative to the disc arm 16 so that the lug 98 can be aligned with a different one of the sockets 100. Moving the lever arm 96 to the latched position shown in FIG. 13 draws the packer arm 78 and disc arm 16 together and clamps them to restrict further relative rotation therebetween, and causes the lug to engage in a next desired mating socket to fix the angular position of the packer arm with respect to the disc arm.

Accordingly the position of the packer arm and the height of the packer wheel relative to the disc arm, and thus the depth of the furrow, can be adjusted. In such similar adjustments where a pin is simply inserted into corresponding holes to adjust relative positions, there is some tolerance required to allow the pin to be inserted. This tolerance provides room for the pin to vibrate during use, which vibration leads to wear of the pin and holes with the result that the adjustment can soon become loose and imprecise. The illustrated mechanism where the packer arm 78 and disc arm 16 are clamped together substantially removes any movement during use and thus reduces wear.

The furrow opener device described above permits a furrow to be formed with a groove extending laterally from one side of the furrow below the ground so that a fertilizer row can be deposited in particulate form or liquid form to the deepest part of the furrow while seed can be deposited through the second product delivery tube in the wing member to an outermost portion of the groove farthest from the fertilizer in the furrow so that a seed row is formed spaced upwardly and laterally outwardly in relation to the fertilizer row in a desirable configuration. The narrow height of the wing member and its position below the ground prevents any seed being deposited therein from bouncing into the furrow with the fertilizer due to the layer of earth above the groove which immediately traps the seed within the groove. Furthermore the configuration of the passage to be fully enclosed up to the output which terminates within an outlet chamber 74 defined between the top plate and the shield member 72 ensures that seed is trapped therein and is only permitted to be deposited through the rearward facing opening at the rear of the wing member. The laterally outward and downward inclination of the wing member further ensures that seed is deposited farthest from the furrow to prevent bouncing seed falling into the deepest part of the furrow with the fertilizer where it is subject to damage from high concentration of fertilizer.

Figure 11:
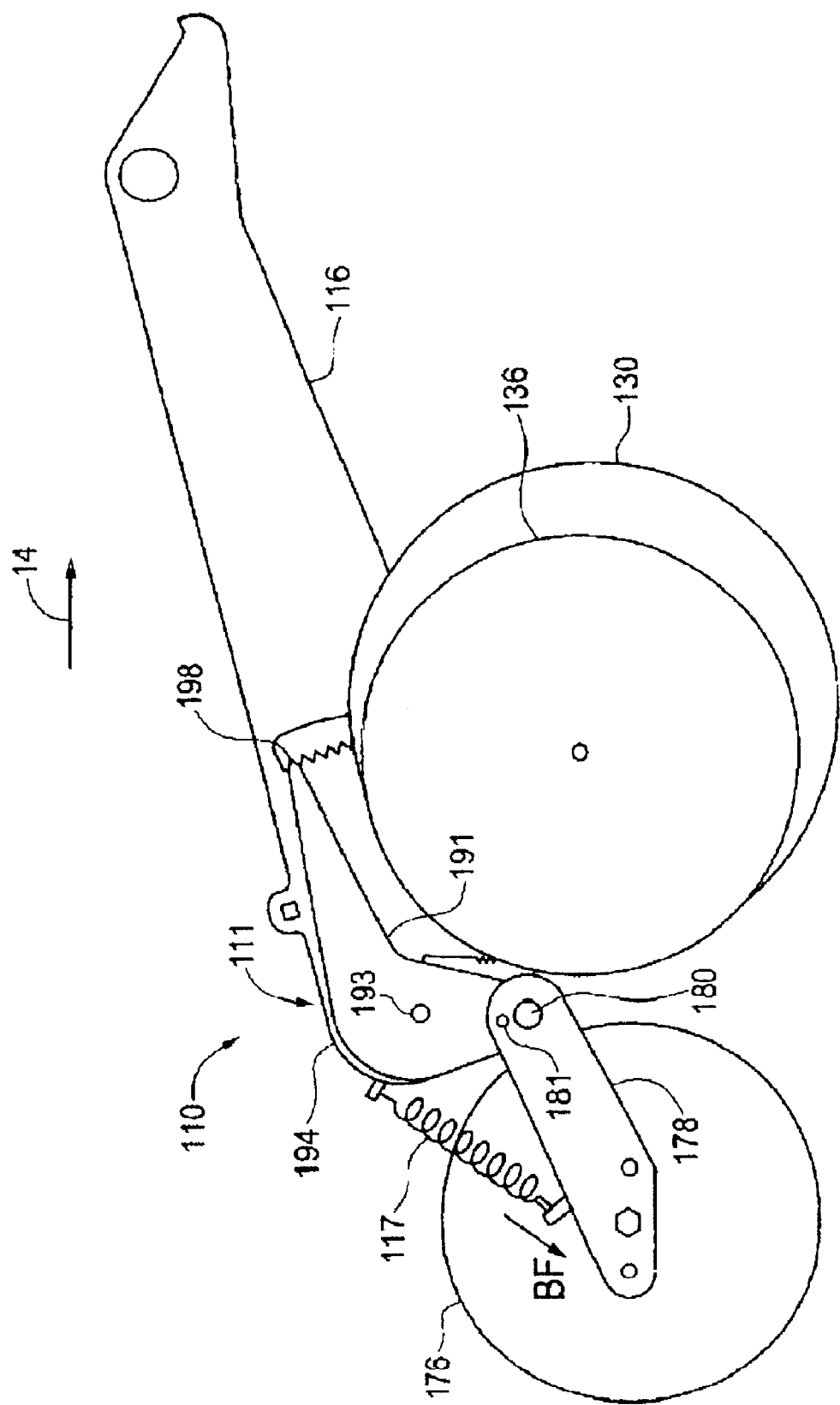
FIG. 11 is a schematic side elevational view of an alternate embodiment of the furrow opener device where the furrow opener is a disc.

An alternative embodiment of the furrow opener device 110, schematically shown in FIG. 11, comprises an opener arm 116 arranged to be supported on an implement frame. A furrow opener, illustrated as a disc 130, is supported on the opener arm to open a furrow in the ground when displaced in the forward working direction 14. A product delivery tube (not illustrated) is configured to deposit product into the furrow made by the disc 130. A gauge wheel 136 is supported adjacent the furrow opener disc 130 and the gauge wheel has a bottom end supported spaced above a bottom end of the furrow opener disc 130.

A packer arm 178 extends rearwardly in relation to the furrow opener disc 130, and a packer wheel 176 is supported on the packer arm rearwardly of the furrow opener disc.

A packer mechanism 111 is operative to pivotally support the packer arm 178 on the disc opener arm 116 in first and second configurations. The packer arm 178 is pivotally attached to the disc opener arm 116 about a packer arm axis at packer pin 180, and the packer wheel is biased downwardly by a compression spring 117 attached to the opener arm and the packer arm, and exerting a bias force BF.

In the first configuration the packer wheel 176 is biased downwardly in relation to the opener arm 116 and the hinge at the packer pin 180 is free. The packer wheel can move up and down with respect to the opener arm such that the depth of penetration of the furrow opener is gauged by the gauge wheel. In response to a bias force exerted on the opener arm by a spring or hydraulic cylinder as described above the furrow opener disc 130 penetrates the ground until the bottom end of the gauge wheel 136 contacts the ground, and as the device 110 moves along the ground the opener arm 116 can move up and down in response to variations in the terrain, and the bottom end of the furrow opener disc 130 is maintained at a desired distance below the ground by the adjacent gauge wheel. The hinge at the packer pin 180 is free to allow the packer arm 178 to pivot with respect to the opener arm 116, and so the required downward packing force is transferred from the opener arm to the packer arm by the spring 117.

The vertical location of the hinge at the packer arm axis is adjustable to vary the bias force BF exerted by the spring 117. The front end of the packer arm 178 is pivotally attached about the packer pin 180 to a rotatable member 191 that is pivotally attached to the rear end of the opener arm 116 at pivot axis 193, and is secured by a latch mechanism 194 similar to that described above where a lug 198 at a pointed tip of the rotatable member 191 aligns with a selected one of a plurality of mating sockets positioned and fixed along an arc like path on the opener arm 116.

Thus opening the latch 194 and lowering the packer pin 180 relative to the opener arm compresses the spring 117 and effectively increases the bias force BF applied by the spring 117 to increase downward pressure on the packer wheel 176. In FIG. 11 the packer mechanism 111 is shown in a position where the packer pin is at the lowest possible position. Alternatively, raising the packer pin 180 relative to the opener arm at the latch 194 lengthens the spring 117 and causes the bias force BF to be decreased.

Thus in the first configuration the depth of the furrow is controlled by the gauge wheel 136 and packing force on the packer wheel 176 is provided by the spring 117.

In the second configuration the hinge at the packer pin 180 is locked, for example by a lock pin 181 through corresponding holes in the packer arm 178 and rotatable member 191, such that the packer arm 178 is fixed relative to the opener arm 116, and such that the spring 117 has essentially no effect on the operation. The gauge wheel 136 is raised so that the depth of penetration of the furrow opener disc 130 is gauged by the packer wheel 176. In the device 110 where the furrow opener is a disc, the gauge wheel is generally positioned close to the disc 130 and is oriented to clean the outer side of the disc 130 in either the first or second configurations. Then in response to the bias force exerted on the opener arm the furrow opener disc 130 penetrates the ground until the bottom end of the packer wheel 176 contacts the ground, and the device 110 moves along the ground the opener arm 116 move up and down in response to variations in the terrain, and the bottom end of the furrow opener disc 130 is maintained at a desired distance below the ground by the following packer wheel 176.

To adjust furrow depth, the packer mechanism 111 is operative in the second configuration to fix pivotal movement of the packer arm 178 relative to the opener arm 116 at different relative angular orientations corresponding to different heights of the packer wheel 176 relative to the opener arm using the same adjustments of rotatable member 191 in one of a plurality of mating sockets as described above for varying the bias force BF.

Accordingly when the earth is dryer and increased packing pressure is desired to effect better covering of the seed the packer mechanism 111 can be configured in the second configuration where all the downward bias force exerted on the opener arm 116 by a spring or hydraulic cylinder is exerted to push the furrow opener into the ground and to force the packer wheel against the ground. None of that force is exerted on the gauge wheel which is raised above the ground, with the result that the maximum packing force available is exerted on the packer wheel.

Alternatively when seeding in wetter soils, it may be preferable to instead more accurately control the seed depth by using the gauge wheel which is more accurate at controlling penetration of the furrow opener due to its close proximity to the furrow opener. The result is greater accuracy of furrow depth, but less packing pressure on the packing wheel which can be accommodated in wetter seasons due to increased germination capacity from the additional moisture in the soil.

Figure 12:
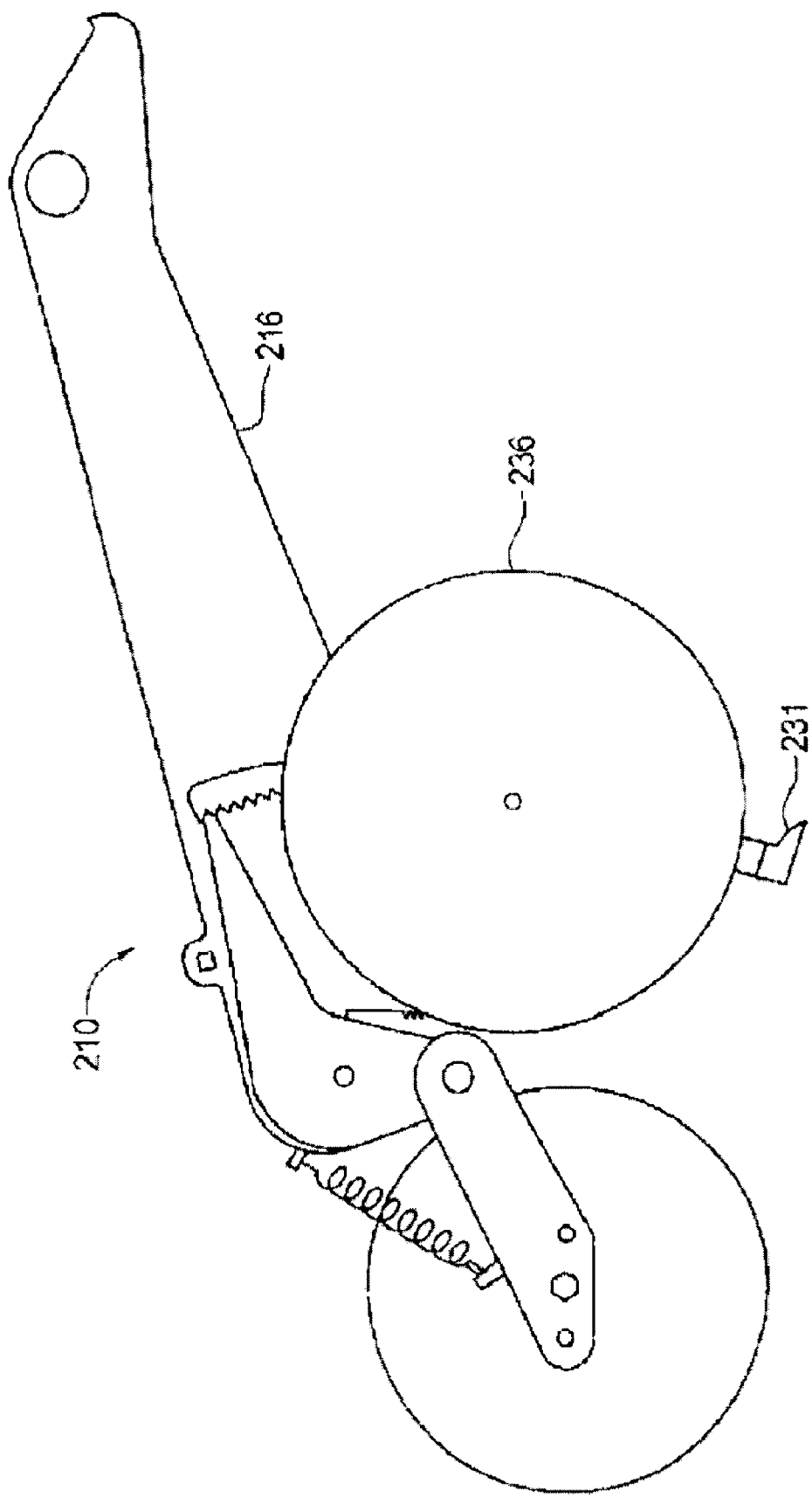
FIG. 12 is a schematic elevational view of a further alternate embodiment of the furrow opener device where the furrow opener is a hoe or knife.

FIG. 12 illustrates a further alternative embodiment of the furrow opener device 210 that is in substantially all respects the same as the device 110 above except that instead of a disc, the furrow opener is provided by a hoe or knife opener 231. As in the device 110, a mechanism is provided to raise and lower the gauge wheel 236 with respect to the opener arm 216. In the second configuration of the device 210 where the gauge wheel 236 is raised and does not act to gauge the depth, the gauge wheel performs essentially no function as there is no disc to clean.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A furrow opener device comprising:
    a disc arranged to be displaced across the ground in a forward working direction to open a primary furrow in the ground;
    a primary product delivery tube arranged to deposit a first product into the primary furrow;
    a scraper body extending generally rearward from a leading scraper edge of the scraper body to a rear trailing edge of the scraper body, the leading scraper edge of the scraper body being supported alongside the disc ahead of the primary product delivery tube so as to be arranged to scrape the disc;
    a wing member supported on a bottom portion of the scraper body in proximity to a bottom end of the disc and extending laterally outwardly away from the disc so as to be arranged to open a groove in the primary furrow projecting laterally into one side wall of the primary furrow below a surface of the ground; and
    a secondary product delivery tube extending generally downward from an input opening at a top end of the secondary product delivery tube to an output opening at a bottom end of the secondary product delivery tube located adjacent the wing member and arranged for depositing the product through the secondary product delivery tube into the groove in the primary furrow opened by the wing member.

2. The device according to claim 1 wherein the primary product delivery tube is arranged to deposit fertilizer into the primary furrow and the secondary product delivery tube is arranged to deliver seed to the groove in the furrow spaced upwardly and to one side relative to the fertilizer.

3. The device according to claim 1 wherein the scraper body is supported to one side of the disc such that the primary product delivery tube is supported between the disc and the scraper body and the rear trailing edge of the scraper body is supported spaced laterally outward from the disc rearward of the primary product delivery tube.

4. The device according to claim 1 wherein the secondary product delivery tube comprises an enclosed passage extending through the scraper body between the top end and the bottom end of the scraper body.

5. The device according to claim 1 wherein the wing member extends in the longitudinal direction with increasing lateral dimension from a front end at the leading scraper edge to a rear end at the rear trailing edge of the scraper body.

6. The device according to claim 1 wherein the wing member and the scraper body are integrally formed with one another.

7. The device according to claim 1 wherein a top side of the wing member inclines upward from a front end to a back end of the wing member.

8. The device according to claim 1 wherein the wing member extends laterally outwardly at a downward slope from the scraper body.

9. The device according to claim 1 wherein the outlet of the second product delivery tube is only open to a rear side and a bottom side thereof below a top side of the wing member.

10. The device according to claim 1 wherein a top side of the wing member is substantially below a gauge height which gauges depth of penetration of the disc into the ground such that the groove is arranged to be formed below a surface of the ground.

11. The device according to claim 1 wherein there is provided a gauge wheel controlling depth of penetration of the disc to form a furrow in the ground and the wing member is substantially wholly located below the gauge wheel.

12. The device according to claim 1 wherein the secondary product delivery tube outlet is open to a bottom side of the wing member and wherein there is provided a shield member spaced below the outlet in close proximity thereto such that space between the wing member and the shield is only open to a rear of the wing member.

13. The device according to claim 12 wherein the shield is sloped downwardly and laterally outwardly in relation to the disc.

14. The device according to claim 1 wherein the scraper body, the wing member and the second product delivery tube are adjustable in height together relative to the disc.

15. The device according to claim 1 further comprising:
   a packer arm supported on the disc arm to extend rearwardly in relation to the disc;
   a packer wheel supported on the disc arm rearwardly of the disc for packing disturbed soil in the furrow; and
   an angle adjustment mechanism arranged to support the packer wheel on the disc arm at a plurality of different orientations pivoted relative to one another about a substantially vertical axis.

16. The device according to claim 1 further comprising:
   a gauge wheel supported adjacent the disc opposite the product delivery tube, the gauge wheel having a bottom end supported spaced above a bottom end of the disc for engaging the ground to gauge a depth of penetration of the disc into the ground;
   a packer arm supported on the disc arm to extend rearwardly in relation to the disc;
   a packer wheel supported on the disc arm rearwardly of the disc for packing disturbed soil in the furrow; and
   a packer mechanism operative to pivotally support the packer arm on the disc arm in a first configuration wherein the packer wheel is biased downwardly in relation to the disc arm and can move up and down with respect to the disc arm such that the depth of penetration of the disc is gauged by the gauge wheel, and in a second configuration wherein the packer arm is fixed relative to the disc arm such that the depth of penetration of the disc is gauged by the packer wheel.

17. The device according to claim 16 wherein the packer mechanism is arranged to support the packer wheel in fixed relation to the disc arm in the second configuration at different respective heights relative to disc arm.

* * * * *